US011383300B2

(12) United States Patent
Okamura et al.

(10) Patent No.: US 11,383,300 B2
(45) Date of Patent: Jul. 12, 2022

(54) SINTERED MATERIAL AND CUTTING TOOL INCLUDING THE SAME

(71) Applicants: Sumitomo Electric Industries, Ltd., Osaka (JP); SUMITOMO ELECTRIC HARDMETAL CORP., Itami (JP)

(72) Inventors: Katsumi Okamura, Osaka (JP); Akito Ishii, Osaka (JP); Satoru Kukino, Itami (JP)

(73) Assignees: Sumitomo Electric Industries, Ltd., Osaka (JP); Sumitomo Electric Hardmetal Corp., Itami (JP)

( * ) Notice: Subject to any disclaimer, the term of this patent is extended or adjusted under 35 U.S.C. 154(b) by 173 days.

(21) Appl. No.: 16/606,983

(22) PCT Filed: Jul. 26, 2018

(86) PCT No.: PCT/JP2018/028011
§ 371 (c)(1),
(2) Date: Oct. 21, 2019

(87) PCT Pub. No.: WO2019/087481
PCT Pub. Date: May 9, 2019

(65) Prior Publication Data
US 2020/0130061 A1     Apr. 30, 2020

(30) Foreign Application Priority Data

Oct. 30, 2017  (JP) .............................. JP2017-209056

(51) Int. Cl.
*B22F 7/00*      (2006.01)
*B23B 27/18*     (2006.01)
*B22F 1/105*     (2022.01)
*B22F 3/10*      (2006.01)
*B22F 5/00*      (2006.01)

(52) U.S. Cl.
CPC .............. *B22F 7/008* (2013.01); *B22F 1/105* (2022.01); *B23B 27/18* (2013.01); *B22F 3/10* (2013.01); *B22F 2005/001* (2013.01); *B22F 2302/205* (2013.01); *B22F 2303/01* (2013.01)

(58) Field of Classification Search
CPC .. B22F 7/008; B22F 1/105; B22F 3/10; B22F 2005/001; B22F 2302/205; B22F 2303/01; B23B 27/18
USPC ........................................................ 75/244
See application file for complete search history.

(56) References Cited

U.S. PATENT DOCUMENTS

2008/0016785 A1   1/2008   Kukino et al.
2008/0254282 A1  10/2008   Kukino et al.
2010/0099548 A1   4/2010   Okamura et al.

FOREIGN PATENT DOCUMENTS

| CN | 104526582 A   |   | 4/2015  |
| EP | 1547990 A2    |   | 6/2005  |
| GB | 1450360 A     |   | 9/1976  |
| JP | 2004330320 A  | * | 11/2004 |
| JP | 2005-187260 A |   | 7/2005  |
| WO | 2006/112156 A1|   | 10/2006 |
| WO | 2007/039955 A1|   | 4/2007  |
| WO | 2008/093577 A1|   | 8/2008  |

OTHER PUBLICATIONS

JP-2004330320-A Translation (Year: 2004).*

* cited by examiner

*Primary Examiner* — Brian D Walck
*Assistant Examiner* — Danielle Carda
(74) *Attorney, Agent, or Firm* — Baker Botts L.L.P.; Michael A. Sartori

(57) ABSTRACT

A sintered material has 3% by volume or more and 80% by volume or less of cubic boron nitride grains and a binder. The binder contains: one or more types selected from the group consisting of one or more compounds composed of one or more first elements selected from the group consisting of a group 4 element, a group 5 element, a group 6 element, Al and Si and one or more second elements selected from the group consisting of C, N, O and B, and a solid solution of these compounds; and one or more metallic elements selected from the group consisting of Li, Ca, Na, Sr, Ba and Be. The binder contains the one or more metallic elements of 0.001% by mass or more and 0.5% by mass or less in total, and oxygen of 0.1% by mass or more and 10.0% by mass or less.

4 Claims, No Drawings

SINTERED MATERIAL AND CUTTING TOOL INCLUDING THE SAME

TECHNICAL FIELD

The present disclosure relates to a sintered material having cubic boron nitride grains and a binder, and a cutting tool including the sintered material. The present application claims priority based on Japanese Patent Application No. 2017-209056 filed on Oct. 30, 2017. All the contents described in the Japanese patent application are incorporated herein by reference.

BACKGROUND ART

Cutting and thus finishing by using a tool using a cubic boron nitride (hereinafter also referred to as "cBN") sintered material is becoming common in processing iron based hard-to-cut materials, high-hardness hardened steel, in particular. In recent years, while a demand for a cBN sintered material when it is used in high-efficiency processing is becoming severer, there is also a demand for increased tool life.

Japanese Patent Laying-Open No. 2005-187260 (Patent Literature 1) and WO 2006/112156 (Patent Literature 2) disclose that trace amounts of elements such as alkali metal, alkaline earth metal, carbon and the like are contained in cBN grains to increase the bonding force between the cBN grains and hence improve tool life in processing hard-to-cut materials.

WO 2008/093577 (Patent Literature 3) discloses blending a trace amount of a transition metal element or the like with a binder to improve a cBN sintered material in wear resistance and fracture resistance in processing a hard-to-cut material.

CITATION LIST

Patent Literature

PTL 1: Japanese Patent Laying-Open No. 2005-187260
PTL 2: WO 2006/112156
PTL 3: WO 2008/093577

SUMMARY OF INVENTION

A sintered material according to one aspect of the present disclosure is a sintered material having 3% by volume or more and 80% by volume or less of cubic boron nitride grains and a binder,
 the binder containing: one or more types selected from the group consisting of one or more types of compounds composed of one or more types of first elements selected from the group consisting of a group 4 element, a group 5 element and a group 6 element in the periodic table, Al and Si and one or more types of second elements selected from the group consisting of C, N, O and B, and a solid solution of these compounds; and one or more types of metallic elements selected from the group consisting of Li, Ca, Na, Sr, Ba and Be,
 the binder containing the one or more types of metallic elements in an amount of 0.001% by mass or more and 0.5% by mass or less in total,
 the binder containing oxygen in an amount of 0.1% by mass or more and 10.0% by mass or less.

A cutting tool according to one aspect of the present disclosure is a cutting tool including the above sintered material.

DETAILED DESCRIPTION

Problem to be Solved by the Present Disclosure

However, even with the techniques of Patent Literature 1 to 3, it is impossible to satisfy both severe demands in application to recent high-efficiency processing and the demand for excellent tool life, and thus there is a demand for further better performance.

Therefore, an object is to provide a sintered material exhibiting an excellent tool life when the sintered material is applied to a cutting tool and even used for high-efficiency processing of high hardness hardened steel, and a cutting tool including the sintered material.

Advantageous Effect of the Present Disclosure

According to the above aspect a sintered material can be provided which exhibits an excellent tool life when the sintered material is applied to a cutting tool and even used for high-efficiency processing of high hardness hardened steel.

DESCRIPTION OF EMBODIMENTS

Initially, embodiments of the present disclosure will be enumerated and specifically described.

(1) A sintered material according to one aspect of the present disclosure is a sintered material having 3% by volume or more and 80% by volume or less of cubic boron nitride grains and a binder. The binder contains: one or more types selected from the group consisting of one or more types of compounds composed of one or more types of first elements selected from the group consisting of a group 4 element, a group 5 element and a group 6 element in the periodic table, Al and Si and one or more types of second elements selected from the group consisting of C, N, O and B, and a solid solution of these compounds; and one or more types of metallic elements selected from the group consisting of Li, Ca, Na, Sr, Ba and Be. The binder contains the one or more types of metallic elements in an amount of 0.001% by mass or more and 0.5% by mass or less in total. The binder contains oxygen in an amount of 0.1% by mass or more and 10.0% by mass or less.

The sintered material of the present embodiment exhibits an excellent tool life when the sintered material is applied to a cutting tool and used for high-efficiency processing of high hardness hardened steel. The sintered material of the present embodiment exhibits excellent tool life not only in high-efficiency processing of high hardness hardened steel but also in high-efficiency processing of difficult-to-cut materials such as iron-based heat-resistant alloys, nickel-based heat-resistant alloys, titanium alloys, and the like.

(2) The binder preferably contains one or both of the Li and the Ca in an amount of 0.001% by mass or more and 0.1% by mass or less in total, and the oxygen in an amount of 0.5% by mass or more and 5.0% by mass or less. This provides a further increased tool life.

(3) The binder preferably contains a nitride of one or both of Ti and Zr, one or both of the Li and the Ca, the oxygen, and carbon, contains one or both of the Li and the Ca in an amount of 0.001% by mass or more and 0.01% by mass or less in total, and contains the carbon in an amount of 0.001% by mass or more and 0.5% by mass or less. This provides a further increased tool life.

(4) A cutting tool according to one aspect of the present disclosure is a cutting tool including the sintered material described in the above items (1) to (3). The cutting tool of the present embodiment exhibits an excellent tool life in high-efficiency processing of high hardness hardened steel.

Detailed Description of Embodiments

A specific example of a sintered material according to an embodiment of the present disclosure will now be described below.

In the present specification, when a compound or the like is represented by a chemical formula without specifying any specific atomic ratio, it includes any conventionally known atomic ratio and is not necessarily limited to those falling within the stoichiometric range. For example, for "TiCN," the ratio of the number of atoms constituting TiCN is not limited to Ti:C:N=1:0.5:0.5, and includes any conventionally known atomic ratio. Furthermore, in the present specification, an expression in the form of "A-B" means a range's upper and lower limits (that is, A or more and B or less), and when A is not accompanied by any unit and B is alone accompanied by a unit, A has the same unit as B.

[Sintered Material]

The sintered material according to the present embodiment is a sintered material including 3% by volume or more and 80% by volume or less of cubic boron nitride grains (hereinafter also referred to as "cBN grains") and a binder (the sintered material will hereinafter be also referred to as a "cBN sintered material"). The sintered material according to the present embodiment may include another component as long as the sintered material includes the two components of cBN and a binder, and can contain an inevitable impurity attributed to a raw material used, a manufacturing condition, and the like.

(Cubic Boron Nitride Grains)

The sintered material contains cubic boron nitride grains in an amount of 3% by volume or more and 80% by volume or less. The cBN grains are high in hardness, strength and toughness, and act as a skeleton in the sintered material and play a role of maintaining a material strength that can endure cutting of high hardness hardened steel.

When the content of cBN grains is less than 3% by volume, it is not possible to maintain the material strength that can endure cutting of high hardness hardened steel. On the other hand, when the content of cBN grains exceeds 80% by volume, the binder content relatively decreases resulting in decreased wear resistance. The content of cBN grains is preferably 20% by volume or more and 75% by volume or less, and more preferably 45% by volume or more and 65% by volume or less, for increased tool life.

The content (in % by volume) of cBN grains in the sintered material can be confirmed by observing the sintered material's structure, subjecting the sintered material to an elemental analysis, and the like by using an energy dispersive X-ray analyzer (EDX) accompanying a scanning electron microscope (SEM).

Specifically, the content (in % by volume) of cBN grains can be determined as follows: Initially, the sintered material is cut at a desired position to prepare a sample including a cross section. The cross section of the sintered material can be prepared using a focused ion beam device, a cross section polisher, or the like. Subsequently, the cross section of the cBN sintered material is observed with an SEM with a magnification of 2000 times to obtain a backscattered electron image. In the backscattered electron image, a region where the cBN grains are present will be a black region and a region where the binder is present will be a gray region or a white region.

Subsequently, the backscattered electron image is binarized using image analysis software (for example, "WinROOF" by Mitani Corporation) and each area ratio is calculated from the binarized image. By considering the calculated area ratio as a value in % by volume, the content (in % by volume) of cBN can be obtained. By this, the binder's percentages by volume can be simultaneously obtained.

The content (in % by volume) of cBN grains in the sintered material will be the same amount as the content of cBN powder in the whole raw material powder (hereinafter also referred to as a "final powdery product"). Therefore, by controlling the content of cBN powder in the final powdery product when manufacturing the sintered material, the content of cBN grains in the sintered material can be adjusted to fall within a desired range.

Cubic boron nitride (cBN) exists as cBN grains in a sintered material. The average grain diameter (D50) of the cBN grains is not particularly limited, and can for example be 0.1 to 10.0 μm. In general, the smaller the average grain diameter is, the higher the cBN sintered material tends to be in hardness, and the less the grain diameter varies, the more homogeneous the cBN sintered material tends to be in nature. The average grain diameter of the cBN grains is preferably 0.5 to 4.0 μm, for example.

The D50 of the cBN grains is determined as follows: Initially, in conformity to the above method of determining the content of cBN grains, a sample including a cross section of a base material is prepared and a backscattered electron image is obtained. Subsequently, the equivalent circular diameter of each black region in the backscattered electron image is calculated using image analysis software. It is preferable to calculate 100 or more cBN grains' equivalent circular diameters by observing 5 or more fields of view.

Subsequently, the equivalent circular diameters are arranged from the minimum value to the maximum value to obtain a cumulative distribution. A grain diameter for which the cumulative distribution presents a cumulative area of 50% will be D50. Note that an equivalent circular diameter means the diameter of a circle having the same area as the area of a cBN grain measured.

(Binder)

The binder contains: one or more types selected from the group consisting of one or more types of compounds composed of one or more types of first elements selected from the group consisting of a group 4 element of the Periodic Table (Ti (titanium), Zr (zirconium), Hf (hafnium), etc.), a group 5 element of the Periodic Table (V (vanadium), Nb (niobium), Ta (tantalum), etc.), a group 6 element of the Periodic Table (Cr (chromium), Mo (molybdenum), W (tungsten), etc.), Al (aluminum) and Si (silicon) and one or more types of second elements selected from the group consisting of C (carbon), N (nitrogen), O (oxygen) and B (boron), and a solid solution of these compounds (hereinafter also referred to as a "binder material"); and one or more types of metallic elements selected from the group consisting of Li (lithium), Ca (calcium), Na (sodium), Sr (strontium), Ba (barium) and Be (beryllium).

The binder plays a role in making cBN particles, which are a difficult-to-sinter material, sinterable at industrial-level pressure and temperature. In addition, the binder is lower in reactivity with iron than cBN. Therefore, when the sintered material contains the binder, and used for cutting high hardness hardened steel, chemical and thermal wear of the sintered material is suppressed. In addition, the sintered material that contains the binder enhances wear resistance in high-efficiency processing of high hardness hardened steel.

A specific example of the first element selected from the group consisting of the group 4 element, the group 5 element and the group 6 element in the periodic table, Al and Si, and one or more second elements selected from the group consisting of C, N, O and B will be described below.

A compound composed of the first element and C (the second element) (i.e., a carbide) can for example be a titanium carbide (TiC), a zirconium carbide (ZrC), a hafnium carbide (HfC), a vanadium carbide (VC), a niobium carbide (NbC), a tantalum carbide (TaC), a chromium carbide ($Cr_3C_2$), a molybdenum carbide (MoC), a tungsten carbide (WC), an aluminum carbide ($Al_4C_3$), and a silicon carbide (SiC).

A compound composed of the first element and N (the second element) (i.e., a nitride) can for example be a titanium nitride (TiN), a zirconium nitride (ZrN), a hafnium nitride (HfN), a vanadium nitride (VN), a niobium nitride (NbN), a tantalum nitride (TaN), a chromium nitride ($Cr_2N$), a molybdenum nitride (MoN), a tungsten nitride (WN), an aluminum nitride (AlN), a silicon nitride ($Si_3N_4$), a titanium zirconium nitride (TiZrN), a titanium hafnium nitride (TiHfN), a titanium vanadium nitride (TiVN), a titanium niobium nitride (TiNbN), a titanium tantalum nitride (TiTaN), a titanium chromium nitride (TiCrN), a titanium molybdenum nitride (TiMoN), a titanium tungsten nitride (TiWN), a zirconium hafnium nitride (ZrHfN), a zirconium vanadium nitride (ZrVN), a zirconium niobium nitride (ZrNbN), a zirconium tantalum nitride (ZrTaN), a zirconium chromium nitride (ZrCrN), a zirconium molybdenum nitride (ZrMoN), a zirconium tungsten nitride (ZrWN), a hafnium vanadium nitride (HfVN), a hafnium niobium nitride (HfNbN), a hafnium tantalum nitride (HfTaN), a hafnium chromium nitride (HfCrN), a hafnium molybdenum nitride (HfMoN), a hafnium tungsten nitride (HfWN), a vanadium niobium nitride (VNbN), a vanadium tantalum nitride (VTaN), a vanadium chromium nitride (VCrN), a vanadium molybdenum nitride (VMoN), a vanadium tungsten nitride (VWN), a niobium tantalum nitride (NbTaN), a niobium chromium nitride (NbCrN), a niobium molybdenum nitride (NbMoN), a niobium tungsten nitride (NbWN), a tantalum chromium nitride (TaCrN), a tantalum molybdenum nitride (TaMoN), a tantalum tungsten nitride (TaWN), a chromium molybdenum nitride (CrMoN), a chromium tungsten nitride (CrWN), and a molybdenum tungsten nitride (MoWN).

A compound composed of the first element and O (the second element) (i.e., an oxide) can for example be a titanium oxide ($TiO_2$), a zirconium oxide ($ZrO_2$), a hafnium oxide ($HfO_2$), a vanadium oxide ($V_2O_5$), a niobium oxide ($Nb_2O_5$), a tantalum oxide ($Ta_2O_5$), a chromium oxide ($Cr_2O_3$), a molybdenum oxide ($MoO_3$), a tungsten oxide ($WO_3$), an aluminum oxide ($Al_2O_3$), and a silicon oxide ($SiO_2$).

A compound composed of the first element and B (the second element) (i.e., a boride) can for example be a titanium boride ($TiB_2$), a zirconium boride ($ZrB_2$), a hafnium boride ($HfB_2$), a vanadium boride ($VB_2$), a niobium boride ($NbB_2$), a tantalum boride ($TaB_2$), a chromium boride (CrB, $CrB_2$), a molybdenum boride (MoB), a tungsten boride (WB), an aluminum boride ($AlB_{12}$), and a silicon boride (Sat).

A compound composed of the first element, C (the second element), and N (the second element) (i.e., a carbonitride) can for example be a titanium carbonitride (TiCN), a zirconium carbonitride (ZrCN), a hafnium carbonitride (HfCN), a titanium zirconium carbonitride (TiZrCN), a titanium niobium carbonitride (TiNbCN), and a titanium hafnium carbonitride (TiHfCN).

A compound composed of the first element, O (the second element), and N (the second element) (i.e., a oxynitride) can for example be a titanium oxynitride (TiON), a zirconium oxynitride (ZrON), a hafnium oxynitride (HfON), a vanadium oxynitride (VON), a niobium oxynitride (NbON), a tantalum oxynitride (TaON), a chromium oxynitride (CrON), a molybdenum oxynitride (MoON), a tungsten oxynitride (WON), and an aluminum oxynitride (AlON).

A solid solution of the compounds described above means a state in which two or more types of these compounds are dissolved in the crystal structure of each other, and means an interstitial solid solution or a substitutional solid solution.

When the above compound is not limited to any specific atomic ratio, the compound is assumed to include any conventionally known atomic ratio, and is not necessarily limited to those falling within the stoichiometric range. For example, for "TiN," the ratio of the number of atoms constituting TiN is not limited to Ti:N=1:1, and includes any conventionally known atomic ratio (for example, TiN and $Ti_3N_4$).

The above compound can have any known crystal structure. The above compound may be one type of compound or two or more types of compounds in combination.

The binder contains a total of 0.001% by mass or more and 0.5% by mass or less of one or more types of metallic elements selected from the group consisting of Li, Ca, Na, Sr, Ba and Be. Causing the binder to contain these metallic elements in the above amount significantly improves tool life in high-efficiency processing of high hardness hardened steel.

The present inventors performed highly-efficiency processing of high hardness hardened steel with a cutting tool using a conventional cBN sintered material, and investigated in detail the cutting edge of the tool when it reached the end of its life. As a result, it has been confirmed that the binder was selectively, slightly broken and worn away. Furthermore, as a result of investigating the starting point of the damage through a transmission type electron microscope, it has been found that cracking started from a point inside a primary grain of the binder. It is presumed that the primary grain of the binder is a single crystal and a point at which the cracking starts is a lattice defect of the single crystal. Therefore, the present inventors have reached a hypothesis that if the lattice defect can be substituted with an appropriate element, the binder can be dramatically improved in fracture resistance and wear resistance. As a result of trying various additive elements, the present inventors have found that by causing the binder to contain in a predetermined amount one or more types of metallic elements selected from the group consisting of Li, Ca, Na, Sr, Ba and Be, chipping can be suppressed and significantly extended tool life can be achieved.

When the binder contains the one or more types of metallic elements in an amount of less than 0.001% by mass in total, the binder cannot be effectively prevented from being slightly broken or worn. On the other hand, when the binder contains the one or more types of metallic elements in an amount exceeding 0.5% by mass in total, a weak point of the one or more types of metallic elements, that is, low hardness, becomes manifest, and may invite reduced hardness of the sintered material. The binder preferably contains the one or more types of metallic elements in an amount of 0.002% by mass or more and 0.1% by mass or less in total, more preferably 0.004% by mass or more and 0.01% by mass or less in total, for increased tool life.

The binder preferably contains one or both of Li and Ca in an amount of 0.001% by mass or more and 0.1% by mass or less in total. This provides a further increased tool life. The binder more preferably contains one or both of Li and Ca in an amount of 0.002% by mass or more and 0.01% by mass or less in total, still more preferably 0.004% by mass or more and 0.01% by mass or less in total.

The binder preferably contains one or both of Li and Ca in an amount of 0.001% by mass or more and 0.1% by mass or less in total, and oxygen in an amount of 0.5% by mass or more and 5.0% by mass or less. This provides a further increased tool life. The binder more preferably contains one or both of Li and Ca in an amount of 0.002% by mass or more and 0.01% by mass or less in total, still more preferably 0.004% by mass or more and 0.01% by mass or less in total. The binder preferably contains oxygen in an amount of 0.5% by mass or more and 5.0% by mass or less, and more preferably 1.0% by mass or more and 3.0% by mass or less.

The binder preferably contains a nitride of one or both of Ti and Zr, one or both of the Li and the Ca, the oxygen, and carbon, contains one or both of the Li and the Ca in an amount of 0.001% by mass or more and 0.01% by mass or less in total, and contains the carbon in an amount of 0.001% by mass or more and 0.5% by mass or less. This provides a further increased tool life. The binder more preferably contains one or both of the Li and the Ca in an amount of 0.002% by mass or more and 0.007% by mass or less in total. Still preferably, the binder contains carbon in an amount of 0.01% by mass or more and 0.20% by mass or less.

What type of metallic element the binder includes and in what amount (in % by mass) the binder includes the metallic element are determined as follows: Initially, the sintered material is immersed in fluoronitric acid (an acid mixture composed of concentrated nitric acid (concentration: 60%): distilled water:concentrated hydrofluoric acid (concentration: 47%) mixed together at a volumetric ratio of 2:2:1, respectively) for 48 hours in a sealed container. As a result, the binder completely dissolves in the fluoronitric acid, and the cBN grains do not dissolve and thus remain in the solution. The solution in which the binder is dissolved is subjected to quantitative determination for the metallic elements of Li, Ca, Na, Sr, Ba and Be through inductively coupled plasma atomic emission spectroscopy (ICP-AES) to thus calculate the content of each metallic element contained in the binder.

The content(s) (in % by mass) of the one or more types of metallic elements in the binder can be controlled as follows: in the process for manufacturing the sintered material, powder of a metallic element of Li, Ca, Na, Sr, Ba, Be or powder of a nitride, a boronitride and/or the like of these metallic elements is added to powder for a raw material for the binder in such an amount that in the sintered material the binder contains the one or more types of metallic elements in an amount as desired in % by mass.

The source for Li can be lithium metal, lithium nitride, lithium boronitride and lithium calcium boronitride, and the like in the form of powder. The source for Ca can be calcium nitride, calcium boronitride, lithium calcium boronitride and the like in the form of powder. The source for Na can be sodium nitride, sodium boronitride and the like in the form of powder. The source for Sr can be strontium nitride, strontium boronitride and the like in the form of powder. The source for Ba can be barium nitride, barium boronitride, and the like in the form of powder. The source for Be can be beryllium nitride, beryllium boronitride and the like in the form of powder. The method of adding the one or more types of metallic elements is not limited to the above-mentioned method, and any method can be adopted as long as the method can set within a desired range the content(s) of the one or more types of metallic elements in the binder.

(Carbon)

A binder which contains nitride as a main component preferably contains carbon (C) in an amount of 0.001% by mass or more and 0.5% by mass or less. If the carbon content is less than 0.001% by mass, the effect of enhancing the strength of the sintered material by solid solution of carbon may not be obtained. In contrast, if the carbon content exceeds 0.5% by mass, carbon cannot maintain a form of complete solid solution thereof in the binder material, and is present as free carbon and may reduce the strength of the sintered material. The content of carbon in the binder is more preferably 0.01% by mass or more and 0.20% by mass or less.

The content (in % by mass) of carbon (C) in the binder is measured in the following manner: Initially, the sintered material is immersed in fluoronitric acid (an acid mixture composed of concentrated nitric acid (concentration: 60%): distilled water:concentrated hydrofluoric acid (concentration: 47%) mixed together at a volumetric ratio of 2:2:1, respectively) for 48 hours in a sealed container. As a result, the binder completely dissolves in the fluoronitric acid, and the cBN grains do not dissolve and thus remain in the solution. The solution in which the binder is dissolved is subjected to quantitative determination for carbon through infrared absorption to calculate the carbon content.

The content (in % by mass) of carbon (C) in the binder can be adjusted to fall within a desired range, as follows: melamine ($C_3H_6N_6$), polyamide ($[-NH(CH_2)_5CO-]_n$) or a similar organic matter is added to a powdery mixture for the binder including powder for a raw material for the binder, powder of a metallic element, and the like, and a subsequent sintering process is performed with controlled heat treatment temperature, time and atmosphere. Furthermore, when mixing the powdery mixture for the binder and cBN powder together in a cemented carbide ball mill, WC (tungsten carbide) introduced as a contaminant from the ball mill can also be used as a carbon source.

(Oxygen)

During the process for manufacturing the sintered material of the present embodiment, oxygen is introduced into the sintered material. For example, during the step of pulverizing and agitating powder for a raw material for the binder, the step of mixing cBN powder and powder for a raw material for the binder, and storage of the final powdery product including cBN powder and powder for a raw material for the binder, these powders are exposed to oxygen present in the air and oxygen is thus introduced thereinto.

The content of oxygen (O) in the binder is 0.1% by mass or more and 10.0% by mass or less. Reducing the oxygen content in the binder to less than 0.1% by mass may invite an excessively high manufacturing cost. In contrast, if the oxygen content in the binder exceeds 10.0% by mass, a property of an oxide, that is, brittleness becomes manifest, and the sintered material may be impaired in fracture resistance. The oxygen content in the binder is preferably 0.5% by mass or more and 5.0% by mass or less, more preferably 1.0% by mass or more and 3.0% by mass or less.

The content (in % by mass) of oxygen (O) in the binder is measured in the following manner: Initially, the sintered material is immersed in fluoronitric acid (an acid mixture composed of concentrated nitric acid (concentration: 60%): distilled water:concentrated hydrofluoric acid (concentration: 47%) mixed together at a volumetric ratio of 2:2:1, respectively) for 48 hours in a sealed container. As a result, the binder completely dissolves in the fluoronitric acid, and the cBN grains do not dissolve and thus remain in the solution. The solution in which the binder is dissolved is subjected to quantitative determination for oxygen through infrared absorption to calculate the oxygen content.

The content (in % by mass) of oxygen (O) in the binder can be controlled by controlling a manufacturing condition in the process for manufacturing the sintered material, controlling the amount of oxygen in the final powdery product including the cBN powder and powder for a raw material for the binder, or the like. From the viewpoint of making the sintered material uniform and making constituent grains fine grains, it is preferable to control the amount of oxygen by subjecting the final powdery product to a reduction treatment.

The reduction treatment is carried out, for example, by heating the final powdery product in a nitrogen atmosphere at a low oxygen partial pressure. The heating temperature is preferably 1500 to 2000° C., more preferably 1800 to 2000° C. By heating to 1800° C. or higher, the reduction treatment can be performed efficiently. By setting the heating temperature at 2000° C. or lower, it is possible to prevent particles in the final powdery product from melting and becoming coarse. Therefore, it is possible to prevent the average particle diameter of the final powdery product after it is heated from being larger than before it is heated.

The heating time is not particularly limited as long as it continues until the oxygen content of the final powdery product becomes 10.0% by mass or less, and for example it can be 1 to 12 hours. The partial pressure of oxygen applied in the reduction treatment is preferably a low partial pressure of oxygen of $1 \times 10^{-29}$ atm or less. By heating under such a low partial pressure of oxygen, a reduction treatment allowing the oxygen content to be 10.0% by mass or less can be performed efficiently.

In addition, a reduction heat treatment in a hydrogen atmosphere or an ammonium atmosphere is also effective.

[Method for Manufacturing Sintered Material]

The sintered material of the present embodiment can be manufactured for example in the following method:

Powder for a raw material for the binder, that is, powder of one or more types of compounds composed of one or more types of first elements selected from the group consisting of a group 4 element, a group 5 element and a group 6 element in the periodic table, Al, and Si, and one or more types of second elements selected from the group consisting of C, N, O and B, or powder of solid solution of these, is prepared.

Metallic element-containing powder composed of one or more types of metallic elements selected from the group consisting of Li, Ca, Na, Sr, Ba and Be, or a nitride, a boronitride and/or the like of these metallic elements is added to the powder for the raw material for the binder in such an amount that the binder contains the one or more types of metallic elements in an amount of 0.001% by mass or more and 0.5% by mass or less in total, and mixed in a ball mill to obtain a powdery mixture for the binder. In doing so, an organic substance serving as a carbon source, such as melamine and polyamide, may be added and mixed together.

When the content of oxygen in the powdery mixture for the binder exceeds 10% by mass, the powdery mixture for the binder is heated in a nitrogen atmosphere containing oxygen at a low partial pressure and thus undergoes a reduction treatment. For example, a reduction treatment performed with a partial pressure of oxygen of $1 \times 10^{-29}$ atm or less, a reducing temperature of 1800° C., and a reducing time of 2 hours can reduce the oxygen content in the powdery mixture for the binder to 10% by mass or less. Under the same conditions, when the reducing time is 5 hours, the oxygen content can be reduced to 5% by mass or less, and when the reducing time is 10 hours, the oxygen content can be reduced to 1 to 3% by mass.

Subsequently, the powdery mixture for the binder and cBN powder are prepared at a desired volume ratio and mixed together using a ball mill or a bead mill to obtain a final powdery product. The cBN particles have a polar surface, which will be a by-product after they are sintered. Accordingly, the content ratio (in % by volume) of cBN grains in the sintered material is reduced by 0 to 2% from that of cBN powder in the final powdery product. Accordingly, the content ratio of cBN powder to be charged in the final powdery product is determined by considering an amount by which the cBN is decreased by sintering.

It is also possible to reduce the amount of oxygen in the binder to adjust it to be a target amount of oxygen by subjecting the above final powdery product to a treatment similar to the reduction treatment applied to the powdery mixture for the binder, as described above.

Subsequently, the final powdery product is introduced into a capsule made of Mo, and an ultra-high pressure apparatus is employed to increase pressure and temperature to apply a pressure of 5.0 to 8.0 GPa and a temperature of 1400° C. to the final powdery product and maintain it at the pressure and the temperature for 1 to 30 minutes to sinter the final powdery product and thus obtain a sintered material.

[Cutting Tool]

A cutting tool of the present embodiment is a cutting tool including the above sintered material. The cutting tool according to the present embodiment is not limited to a cutting tool entirely formed of the above sintered material, and also includes a tool having only a portion (a cutting edge portion (a cutting edge) or the like, in particular) composed of the sintered material. For example, the cutting tool according to the present embodiment also includes a tool in which only a cutting edge portion of a base body (or a support) made of cemented carbide or the like is composed of the sintered material. In that case, from the literal point of view, the cutting edge portion shall be regarded as a cutting tool. In other words, what has the sintered material occupying only a part of a cutting tool shall also be called a cutting tool.

The cutting tool according to the present embodiment is not particularly limited in shape and application. For example, it can include drills, end mills, indexable inserts for drills, indexable inserts for end mills, indexable inserts for milling, indexable inserts for turning, metal saws, gear cutting tools, reamers, taps, inserts for pin-milling crankshafts, and the like.

EXAMPLES

The present embodiment will now be more specifically described with reference to examples. Note, however, that the present embodiment is not limited to these examples.

<Sample 1-1>

A pot and ball of cemented carbide were used to mix $TiN_{0.5}$ and Al at a mass ratio of 88:12 to obtain powder which in turn underwent a heat treatment in a vacuum at 1200° C. for 30 minutes and thereafter pulverized to obtain powder A for a raw material for a binder (In table 1 it is indicated as "TiN$_{0.5}$:Al" at the column "powder for raw material for binder." Hereinafter, it is also represented as "TiN$_{0.5}$:Al"). Similarly, ZrN$_{0.5}$ and Al were mixed together at a mass ratio of 88:12 to obtain powder which in turn underwent a heat treatment in a vacuum at 1200° C. for 30 minutes to obtain a compound which was in turn pulverized to obtain powder B for a raw material for a binder (In table 1 it is indicated as "ZrN$_{0.5}$:Al" at the column "powder for raw material for binder." Hereinafter, it is also represented as "ZrN$_{0.5}$:Al").

Powder A for a raw material for a binder (TiN$_{0.5}$:Al) and powder B for a raw material for the binder (ZrN$_{0.5}$:Al) were mixed together at a mass ratio of 1:1 to obtain a powdery mixture for a raw material for the binder. To this powdery mixture for the raw material for the binder, lithium nitride powder (indicated as "Li$_3$N" in table 1 at the column "metallic element-containing powder") was added, and they were mixed together to obtain a powdery mixture for the binder. The lithium nitride powder was added in an amount such that the amount of the lithium nitride powder in the powdery mixture for the binder was 0.005% by mass.

Subsequently, cBN powder having an average particle diameter of 3 µm and the above powdery mixture for the binder were mixed together at a blending ratio of 55:45 in volume to obtain a final powdery product. The final powdery product was introduced into a capsule made of Mo, and thereafter an ultra-high pressure apparatus was employed to increase pressure and temperature to apply a pressure of 7 GPa and a temperature of 1400° C. to the final powdery product and maintain it at the pressure and the temperature for 15 minutes to obtain a sintered material.

The binder contained in the obtained sintered material was mainly formed of materials, as shown in Table 1. As shown in Table 1, in Sample 1-1, the binder was mainly composed of titanium nitride and zirconium nitride.

By sintering, the cBN powder and the powdery mixture for the binder react to produce a by-product. The by-product is contained in the binder. In Sample 1-1, the by-product was, for example, aluminum nitride, aluminum boride, aluminum oxide, titanium boride, zirconium boride, and zirconium oxide. These by-products can be identified through XRD.

<Sample 1-2 to Sample 1-6>

Basically, sintered materials were prepared in the same manner as in Sample 1-1. What was different from sample 1-1 is that the lithium nitride powder added to the powdery mixture was replaced with calcium nitride powder in sample 1-2 (in table 1, the powder is indicated as "Ca$_3$N$_2$" at the column "metallic element-containing powder"), sodium nitride powder in sample 1-3, (in table 1, the powder is indicated as "Na$_3$N" at the column "metallic element-containing powder"), strontium nitride powder in sample 1-4 (in table 1, the powder is indicated as "Sr$_3$N$_2$" at the column "metallic element-containing powder"), barium nitride powder in sample 1-5 (in table 1, the powder is indicated as "Ba$_3$N$_2$" at the column "metallic element-containing powder"), and beryllium nitride powder in sample 1-6 (in table 1, the powder is indicated as "Be$_3$N$_2$" at the column "metallic element-containing powder"). Furthermore, in sample 1-2, melamine (C$_3$H$_6$N$_6$) was added to a powdery mixture for a raw material for the binder so that the binder had a carbon content of 0.100% by mass.

The binders contained in the obtained sintered materials were mainly formed of materials, as shown in Table 1. As shown in Table 1, in Samples 1-2 to 1-6, the binders were mainly composed of titanium nitride and zirconium nitride.

By sintering, the cBN powder and the powdery mixture for the binder react to produce a by-product. The by-product is contained in the binder. In Samples 1-2 to 1-6, the by-product was, for example, aluminum nitride, aluminum boride, aluminum oxide, titanium nitride, titanium boride, titanium oxide, zirconium nitride, zirconium boride and zirconium oxide. These by-products can be identified through XRD.

<Sample 1-7 to Sample 1-12>

Basically, sintered materials were prepared in the same manner as in Sample 1-1. What was different from sample 1-1 is that, as the powder for the raw material for the binder, powders A-F for raw materials for binders, as will be described below, were used. These powders for raw materials for binders and metallic element-containing powder (lithium nitride powder) were used to prepare final powdery products which were in turn sintered to obtain sintered materials.

For sample 1-7, powder A for a raw material for a binder (TiN$_{0.5}$:Al) was alone used. For sample 1-8, powder B for a raw material for a binder (ZrN$_{0.5}$:Al) was alone used.

For Sample 1-9, titanium zirconium nitride (TiZrN) was prepared by mixing TiN and ZrN and then subjecting the mixture to a heat treatment at 2000° C. for 30 minutes in an argon atmosphere. Powder A for a raw material for a binder (TiN$_{0.5}$:Al) and titanium zirconium nitride (in table 1, it is indicated as "TiZrN" at the column "powder for raw material for binder") were mixed together at a mass ratio of 1:2 to obtain powder C for a raw material for the binder (hereinafter also referred to as "TiN$_{0.5}$:Al, TiZrN").

For sample 1-10, ZrO$_2$ and carbon were mixed together and subsequently subjected to a heat treatment in a nitrogen atmosphere at 1800° C. for 30 minutes and thus reduced and thus carbonitrided to prepare zirconium carbonitride (ZrCN). Powder A for a raw material for a binder (TiN$_{0.5}$:Al) and zirconium carbonitride (in table 1, it is indicated as "ZrCN" at the column "powder for raw material for binder") were mixed together at a mass ratio of 1:2 to obtain powder D for a raw material for the binder (hereinafter also referred to as "TiN$_{0.5}$:Al, ZrCN").

For sample 1-11, a commercially available titanium carbonitride (in table 1, it is indicated as "TiCN" at the column "powder for raw material for binder") as a raw material and powder D for a raw material for a binder ("TiN$_{0.5}$:Al, ZrCN") were mixed together at a mass ratio of 1:1 to obtain powder E for a raw material for the binder (hereinafter also referred to as "TiN$_{0.5}$:Al, ZrCN, TiCN").

For sample 1-12, TiO$_2$, ZrO$_2$, and carbon were mixed together, and subsequently subjected to a heat treatment in a nitrogen atmosphere at 2200° C. for 30 minutes and thus reduced and thus carbonitrided to prepare titanium zirconium carbonitride (TiZrCN). Powder A for a raw material for a binder (TiN$_{0.5}$:Al) and titanium zirconium carbonitride (in table 1, it is indicated as "TiZrCN" at the column "powder for raw material for binder") were mixed together at a mass ratio of 1:2 to obtain powder F for a raw material for the binder (hereinafter also referred to as "TiN$_{0.5}$:Al, TiZrCN").

The binders contained in the obtained sintered materials were mainly formed of materials, as shown in Table 1. As shown in Table 1, the binder in Sample 1-7 was mainly composed of titanium nitride, the binder in Sample 1-8 was mainly composed of zirconium nitride, the binder in Sample 1-9 was mainly composed of titanium zirconium nitride, the binder in Sample 1-10 was mainly composed of zirconium carbonitride, the binder in Sample 1-11 was mainly composed of titanium carbonitride and zirconium carbonitride, and the binder in Sample 1-12 was mainly composed of titanium zirconium carbonitride.

By sintering, the cBN powder and the powdery mixture for the binder react to produce a by-product. The by-product is contained in the binder. In Samples 1-7 to 1-12, the by-product was, for example, aluminum nitride, aluminum boride, aluminum oxide, titanium nitride, titanium boride, titanium oxide, zirconium nitride, and zirconium oxide. These by-products can be identified through XRD.

<Sample 1-13 to Sample 1-18>

Basically, sintered materials were prepared in the same manner as in Sample 1-1. What is different from sample 1-1 is that, for powder for a raw material for a binder, sample 1-13 used powder A for a raw material for a binder ($TiN_{0.5}$: Al) alone, sample 1-14 used powder B for a raw material for a binder ($ZrN_{0.5}$:Al) alone, sample 1-15 used powder C for a raw material for a binder ($TiN_{0.5}$:Al, TiZrN) alone, sample 1-16 used powder D for a raw material for a binder ($TiN_{0.5}$: Al, ZrCN) alone, sample 1-17 used powder E for a raw material for a binder ($TiN_{0.5}$:Al, ZrCN, TiCN) alone, and sample 1-18 used powder F for a raw material for a binder ($TiN_{0.5}$:Al, TiZrCN) alone, and that lithium nitride ($Li_3N$) powder added to the powdery mixture was replaced with calcium nitride ($Ca_3N_2$) powder. Furthermore, in each of samples 1-13 to 1-15, melamine ($C_3H_6N_6$) was added to a powdery mixture for a raw material for a binder so that the binder had a carbon content of 0.100% by mass.

The binders contained in the obtained sintered materials were mainly formed of materials, as shown in Table 1. As shown in Table 1, the binder in Sample 1-13 was mainly composed of titanium nitride, the binder in Sample 1-14 was mainly composed of zirconium nitride, the binder in Sample 1-15 was mainly composed of titanium zirconium nitride, the binder in Sample 1-16 was mainly composed of zirconium carbonitride, the binder in Sample 1-17 was mainly composed of titanium carbonitride and zirconium carbonitride, and the binder in Sample 1-18 was mainly composed of titanium zirconium carbonitride.

By sintering, the cBN powder and the powdery mixture for the binder react to produce a by-product. The by-product is contained in the binder. In Samples 1-13 to 1-18, the by-product was, for example, aluminum nitride, aluminum boride, aluminum oxide, titanium nitride, titanium boride, titanium oxide, zirconium nitride, and zirconium oxide. These by-products can be identified through XRD.

<Sample 1-19 to Sample 1-21>

Basically, sintered materials were prepared in the same manner as in Sample 1-1. What is different from sample 1-1 is that lithium nitride ($Li_3N$) powder added to the powdery mixture for the raw material for the binder was changed in amount so that the binder contained lithium (Li) in an amount as shown in table 1, and that melamine ($C_3H_6N_6$) was added to the powdery mixture for the raw material for the binder so that the binder had a carbon content as shown in table 1.

The binders contained in the obtained sintered materials were mainly formed of materials, as shown in Table 1. As shown in Table 1, in Samples 1-19 to 1-21, the binders were mainly composed of titanium nitride and zirconium nitride.

By sintering, the cBN powder and the powdery mixture for the binder react to produce a by-product. The by-product is contained in the binder. In Samples 1-19 to 1-21, the by-product was, for example, aluminum nitride, aluminum boride, aluminum oxide, titanium nitride, titanium boride, titanium oxide, zirconium nitride, and zirconium oxide. These by-products can be identified through XRD.

<Sample 1-22 to Sample 1-24>

Basically, sintered materials were prepared in the same manner as in Sample 1-2. What is different from sample 1-2 is that calcium nitride ($Ca_3N_2$) powder added to the powdery mixture for the raw material for the binder was changed in amount so that the binder contained calcium (Ca) in an amount shown in table 1, and that melamine ($C_3H_6N_6$) was added to the powdery mixture for the raw material for the binder so that the binder had a carbon content shown in table 1.

The binders contained in the obtained sintered materials were mainly formed of materials, as shown in Table 1. As shown in Table 1, in Samples 1-22 to 1-24, the binders were mainly composed of titanium nitride and zirconium nitride.

By sintering, the cBN powder and the powdery mixture for the binder react to produce a by-product. The by-product is contained in the binder. In Samples 1-22 to 1-24, the by-product was, for example, aluminum nitride, aluminum boride, aluminum oxide, titanium nitride, titanium boride, titanium oxide, zirconium nitride, and zirconium oxide. These by-products can be identified through XRD.

<Sample 1-25>

Basically, a sintered material was prepared in the same manner as in Sample 1-2. What is different from sample 1-2 is that the cBN powder and the powdery mixture for the binder were mixed at a mixing ratio of 3:97 in volume, and that melamine ($C_3H_6N_6$) was added to the powdery mixture for the raw material for the binder so that the binder had a carbon content shown in table 1.

The binder contained in the obtained sintered material was mainly formed of materials, as shown in Table 1. As shown in Table 1, in Sample 1-25, the binder was mainly composed of titanium nitride and zirconium nitride.

By sintering, the cBN powder and the powdery mixture for the binder react to produce a by-product. The by-product is contained in the binder. In Sample 1-25, the by-product was, for example, aluminum nitride, aluminum boride, aluminum oxide, titanium nitride, titanium boride, titanium oxide, zirconium nitride, and zirconium oxide. These by-products can be identified through XRD.

<Sample 1-26>

Basically, a sintered material was prepared in the same manner as in Sample 1-1. What is different from sample 1-1 is that the cBN powder and the powdery mixture for the binder were mixed at a mixing ratio of 80:20 in volume, and that melamine ($C_3H_6N_6$) was added to the powdery mixture for the raw material for the binder so that the binder had a carbon content shown in table 1.

The binder contained in the obtained sintered material was mainly formed of materials, as shown in Table 1. As shown in Table 1, in Sample 1-26, the binder was mainly composed of titanium nitride and zirconium nitride.

By sintering, the cBN powder and the powdery mixture for the binder react to produce a by-product. The by-product is contained in the binder. In Sample 1-26, the by-product was, for example, aluminum nitride, aluminum boride, aluminum oxide, titanium nitride, titanium boride, titanium oxide, zirconium nitride, and zirconium oxide. These by-products can be identified through XRD.

<Sample 1-27>

Basically, a sintered material was prepared in the same manner as in Sample 1-1. What is different from sample 1-1 is that powder of a metallic element, such as lithium nitride powder, was not added, and that melamine ($C_3H_6N_6$) was added to the powdery mixture for the raw material for the binder so that the binder had a carbon content shown in table 1.

The binder contained in the obtained sintered material was mainly formed of materials, as shown in Table 1. As shown in Table 1, in Sample 1-27, the binder was mainly composed of titanium nitride and zirconium nitride.

By sintering, the cBN powder and the powdery mixture for the binder react to produce a by-product. The by-product is contained in the binder. In Sample 1-27, the by-product was, for example, aluminum nitride, aluminum boride, aluminum oxide, titanium nitride, titanium boride, titanium oxide, zirconium nitride, and zirconium oxide. These by-products can be identified through XRD.

<Sample 1-28>

Basically, a sintered material was prepared in the same manner as in Sample 1-1. What is different from sample 1-1 is that lithium nitride powder added to the powdery mixture for the raw material for the binder was changed in amount so that the binder contained lithium (Li) in an amount as shown in table 1, and that melamine ($C_3H_6N_6$) was added to the powdery mixture for the raw material for the binder so that the binder had a carbon content shown in table 1.

The binder contained in the obtained sintered material was mainly formed of materials, as shown in Table 1. As shown in Table 1, in Sample 1-28, the binder was mainly composed of titanium nitride and zirconium nitride.

By sintering, the cBN powder and the powdery mixture for the binder react to produce a by-product. The by-product is contained in the binder. In Sample 1-28, the by-product was, for example, aluminum nitride, aluminum boride, aluminum oxide, titanium nitride, titanium boride, titanium oxide, zirconium nitride, and zirconium oxide. These by-products can be identified through XRD.

<Measuring Content of Cubic Boron Nitride Grains in Sintered Material>

Initially, the sintered materials of samples 1-1 to 1-28 were cut at a desired position with an argon ion beam device to prepare samples including a cross section. Subsequently, the cross section of each cBN sintered material was observed with an SEM with a magnification of 2000 times to obtain a backscattered electron image.

Subsequently, the obtained backscattered electron image was binarized using image analysis software (for example, "WinROOF" by Mitani Corporation) and from the binarized image a ratio in area of a black region in which cBN grains are present was calculated to determine the content (in % by volume) of cBN grains. It has been confirmed that in each sample the sintered material contained cBN grains at a ratio substantially equal to that at which the final powdery product contained cBN as shown in table 1 (the sintered material contained cBN grains at a ratio lower by about 0-2% than that at which the final powdery product contained cBN grains).

<Measuring Carbon Content in Binder>

The sintered materials of samples 1-1 to 1-28 were immersed in fluoronitric acid (an acid mixture composed of concentrated nitric acid (concentration: 60%):distilled water:concentrated hydrofluoric acid (concentration: 47%) mixed together at a volumetric ratio of 2:2:1, respectively) for 48 hours in a sealed container. After 48 hours, an observation was conducted, and it was found that the binders completely dissolved in the fluoronitric acid and the cBN grains did not dissolve and remained. The solutions in which the binders were dissolved were subjected to quantitative determination for carbon through infrared absorption to calculate the carbon contents in the binders. It has been confirmed that each sample had a carbon content equal to that in the corresponding binder shown in Table 1. In table 1, "-" means that no carbon source was added when producing a sintered material. Therefore, such a sample in this measurement did not present a carbon content above the detection limit.

<Measuring Content of Metallic Element in Binder>

For each sample, the fluoronitric acid solution having the binder dissolved therein, as obtained in the carbon content measurement method as described above, was subjected to quantitative determination for each metallic element of Li, Ca, Na, Sr, Ba and Be through inductively coupled plasma atomic emission spectroscopy (ICP-AES) to thus calculate the content of each metallic element contained in the binder. It has been confirmed that each sample contained each metallic element in an amount equal to that of the metallic element contained in the corresponding binder shown in Table 1. In table 1, "-" means that no metallic element source was added when producing a sintered material. Therefore, such a sample in this measurement did not present a metallic element content above the detection limit.

<Measuring Oxygen Content in Binder>

For each sample, the fluoronitric acid solution having the binder dissolved therein, as obtained in the carbon content measurement method as described above, was subjected to quantitative determination for oxygen through infrared absorption to thus calculate the oxygen content in the binder. Each sample had an oxygen content as shown in Table 1.

<<Cutting Test>>

The sintered materials of Samples 1-1 to 1-28 were each brazed to a substrate of cemented carbide and shaped into a predetermined shape (ISO model number: CNGA 120408) to produce cutting tools. Using the cutting tools, a cutting of 0.1 km was done under the following conditions:

Workpiece: carburized quenched steel SCM415H, hardness: HRC 60, φ100×300 L, round bar Cutting conditions: cutting speed Vc=250 m/min., feed f=0.1 mm/rev., cutting depth d=0.1 mm, DRY After the cutting of 0.1 km, the cutting edge had a flank face side observed with an optical microscope to measure flank wear width. Until flank wear width exceeds 0.1 mm, a cycle of cutting of 0.1 km and flank wear width measurement is repeated, and a cutting distance when flank wear width exceeds 0.1 mm was determined as tool life.

TABLE 1

| sample No. | powdery mixture for raw material for binder | metallic element containing powder | final powdery product cBN content (vol %) | main material(s) in binder | contents of metallic elements in binder (mass %) | | | | | | oxygen content in binder (mass %) | carbon content in binder (mass %) | cutting test life (km) |
|---|---|---|---|---|---|---|---|---|---|---|---|---|---|
| | | | | | Li | Ca | Na | Sr | Ba | Be | | | |
| 1-1 | $TiN_{0.5}$:Al $ZrN_{0.5}$:Al | $Li_3N$ | 55 | titanium nitride, zirconium nitride | 0.005 | — | — | — | — | — | 2.0 | — | 10.5 |
| 1-2 | $TiN_{0.5}$:Al $ZrN_{0.5}$:Al $C_3H_6N_6$ | $Ca_3N_2$ | 55 | titanium nitride, zirconium nitride | — | 0.005 | — | — | — | — | 2.1 | 0.100 | 11.9 |

TABLE 1-continued

| sample No. | powdery mixture for binder — powdery mixture for raw material for binder | powdery mixture for binder — metallic element containing powder | final powdery product cBN content (vol %) | main material(s) in binder | contents of metallic elements in binder (mass %) | | | | | | oxygen content in binder (mass %) | carbon content in binder (mass %) | cutting test life (km) |
|---|---|---|---|---|---|---|---|---|---|---|---|---|---|
| | | | | | Li | Ca | Na | Sr | Ba | Be | | | |
| 1-3 | TiN$_{0.5}$:Al ZrN$_{0.5}$:Al | Na$_3$N | 55 | titanium nitride, zirconium nitride | — | — | 0.005 | — | — | — | 2.4 | — | 10.3 |
| 1-4 | TiN$_{0.5}$:Al ZrN$_{0.5}$:Al | Sr$_3$N$_2$ | 55 | titanium nitride, zirconium nitride | — | — | — | 0.005 | — | — | 3.3 | — | 10.2 |
| 1-5 | TiN$_{0.5}$:Al ZrN$_{0.5}$:Al | Ba$_3$N$_2$ | 55 | titanium nitride, zirconium nitride | — | — | — | — | 0.005 | — | 2.7 | — | 9.8 |
| 1-6 | TiN$_{0.5}$:Al ZrN$_{0.5}$:Al | Be$_3$N$_2$ | 55 | titanium nitride, zirconium nitride | — | — | — | — | — | 0.005 | 2.2 | — | 9.6 |
| 1-7 | TiN$_{0.5}$:Al | Li$_3$N | 55 | titanium nitride | 0.005 | — | — | — | — | — | 3.0 | — | 8.7 |
| 1-8 | ZrN$_{0.5}$:Al | Li$_3$N | 55 | zirconium nitride | 0.005 | — | — | — | — | — | 3.5 | — | 10.1 |
| 1-9 | TiN$_{0.5}$:Al TiZrN | Li$_3$N | 55 | titanium zirconium nitride | 0.005 | — | — | — | — | — | 3.7 | — | 10.3 |
| 1-10 | TiN$_{0.5}$:Al ZrCN | Li$_3$N | 55 | zirconium carbontride | 0.005 | — | — | — | — | — | 4.1 | — | 10.6 |
| 1-11 | TiN$_{0.5}$:Al ZrCN TiCN | Li$_3$N | 55 | titanium carbonitride, zirconium carbontride | 0.005 | — | — | — | — | — | 2.5 | — | 10.9 |
| 1-12 | TiN$_{0.5}$:Al TiZrCN | Li$_3$N | 55 | titanium zirconium carbonitride | 0.005 | — | — | — | — | — | 2.2 | — | 11.3 |
| 1-13 | TiN$_{0.5}$:Al C$_3$H$_6$N$_6$ | Ca$_3$N$_2$ | 55 | titanium nitride | — | 0.005 | — | — | — | — | 3.5 | 0.100 | 8.9 |
| 1-14 | ZrN$_{0.5}$:Al C$_3$H$_6$N$_6$ | Ca$_3$N$_2$ | 55 | zirconium nitride | — | 0.005 | — | — | — | — | 3.3 | 0.100 | 11.6 |
| 1-15 | TiN$_{0.5}$:Al TiZrN C$_3$H$_6$N$_6$ | Ca$_3$N$_2$ | 55 | titanium zirconium nitride | — | 0.005 | — | — | — | — | 3.2 | 0.100 | 10.5 |
| 1-16 | TiN$_{0.5}$:Al ZrCN | Ca$_3$N$_2$ | 55 | zirconium carbontride | — | 0.005 | — | — | — | — | 3.7 | — | 10.7 |
| 1-17 | TiN$_{0.5}$:Al ZrCN TiCN | Ca$_3$N$_2$ | 55 | titanium carbonitride, zirconium carbontride | — | 0.005 | — | — | — | — | 2.9 | — | 11.1 |
| 1-18 | TiN$_{0.5}$:Al TiZrCN | Ca$_3$N$_2$ | 55 | titanium zirconium carbonitride | — | 0.005 | — | — | — | — | 2.7 | — | 11.5 |
| 1-19 | TiN$_{0.5}$:Al ZrN$_{0.5}$:Al C$_3$H$_6$N$_6$ | Li$_3$N | 55 | titanium nitride, zirconium nitride | 0.001 | — | — | — | — | — | 1.4 | 0.001 | 8.6 |
| 1-20 | TiN$_{0.5}$:Al ZrN$_{0.5}$:Al C$_3$H$_6$N$_6$ | Li$_3$N | 55 | titanium nitride, zirconium nitride | 0.1 | — | — | — | — | — | 5.0 | 0.100 | 9.5 |
| 1-21 | TiN$_{0.5}$:Al ZrN$_{0.5}$:Al C$_3$H$_6$N$_6$ | Li$_3$N | 55 | titanium nitride, zirconium nitride | 0.5 | — | — | — | — | — | 10.0 | 0.500 | 8.7 |
| 1-22 | TiN$_{0.5}$:Al ZrN$_{0.5}$:Al C$_3$H$_6$N$_6$ | Ca$_3$N$_2$ | 55 | titanium nitride, zirconium nitride | — | 0.001 | — | — | — | — | 1.2 | 0.001 | 8.8 |
| 1-23 | TiN$_{0.5}$:Al ZrN$_{0.5}$:Al C$_3$H$_6$N$_6$ | Ca$_3$N$_2$ | 55 | titanium nitride, zirconium nitride | — | 0.1 | — | — | — | — | 4.9 | 0.100 | 9.7 |
| 1-24 | TiN$_{0.5}$:Al ZrN$_{0.5}$:Al C$_3$H$_6$N$_6$ | Ca$_3$N$_2$ | 55 | titanium nitride, zirconium nitride | — | 0.5 | — | — | — | — | 9.9 | 0.500 | 8.9 |
| 1-25 | TiN$_{0.5}$:Al ZrN$_{0.5}$:Al C$_3$H$_6$N$_6$ | Ca$_3$N$_2$ | 3 | titanium nitride, zirconium nitride | — | 0.005 | — | — | — | — | 3.2 | 0.150 | 7.3 |
| 1-26 | TiN$_{0.5}$:Al ZrN$_{0.5}$:Al C$_3$H$_6$N$_6$ | Li$_3$N | 80 | titanium nitride, zirconium nitride | 0.005 | — | — | — | — | — | 3.7 | 0.200 | 6.5 |
| 1-27 | TiN$_{0.5}$:Al ZrN$_{0.5}$:Al C$_3$H$_6$N$_6$ | — | 55 | titanium nitride, zirconium nitride | — | — | — | — | — | — | 1.3 | 0.150 | 4.0 |
| 1-28 | TiN$_{0.5}$:Al ZrN$_{0.5}$:Al C$_3$H$_6$N$_6$ | Li$_3$N | 55 | titanium nitride, zirconium nitride | 0.8 | — | — | — | — | — | 14.2 | 0.800 | 4.3 |

Samples 1-1 to 1-26 correspond to examples, and samples 1-27 and 1-28 correspond to comparative examples. It has been found that when the tools of Sample 1-1 to Sample 1-26 were compared with those of samples 1-27 and 1-28, the former presented longer tool life than the latter in high-efficiency processing of high hardness hardened steel.

It should be understood that the embodiments disclosed herein have been described for the purpose of illustration only and in a non-restrictive manner in any respect. The scope of the present invention is defined by the terms of the claims, rather than the embodiments description above, and is intended to include any modifications within the meaning and scope equivalent to the terms of the claims.

The invention claimed is:

1. A sintered material having 3% by volume or more and 80% by volume or less of cubic boron nitride grains and a binder,
the binder containing: one or more types selected from the group consisting of one or more compounds composed of one or more first elements selected from the group consisting of a group 4 element, a group 5 element, a group 6 element, Al and Si and one or more second elements selected from the group consisting of C, N, O and B, and a solid solution of these compounds; and one or more metallic elements selected from the group consisting of Li, Ca, Na, Sr, Ba and Be,
the binder containing the one or more metallic elements in an amount of 0.001% by mass or more and 0.5% by mass or less in total,
the binder containing oxygen in an amount of 0.1% by mass or more and 10.0% by mass or less.

2. The sintered material according to claim 1, wherein the binder contains one or both of the Li and the Ca in an amount of 0.001% by mass or more and 0.1% by mass or less in total, and the oxygen in an amount of 0.5% by mass or more and 5.0% by mass or less.

3. The sintered material according to claim 1, wherein the binder contains a nitride of one or both of Ti and Zr, one or both of the Li and the Ca, the oxygen, and carbon, contains one or both of the Li and the Ca in an amount of 0.001% by mass or more and 0.01% by mass or less in total, and contains the carbon in an amount of 0.001% by mass or more and 0.5% by mass or less.

4. A cutting tool comprising the sintered material according to claim 1.

* * * * *